United States Patent [19]
Sundström et al.

[11] Patent Number: 5,093,178
[45] Date of Patent: Mar. 3, 1992

[54] FLOW DIVIDER

[76] Inventors: Erik Sundström, Havregrand 1, S-811 60 Sandviken; G. H. Pedro Sjögren, Rönnbergagatan 52, S-723 46 Västerås, both of Sweden

[21] Appl. No.: 438,435

[22] PCT Filed: Mar. 20, 1989

[86] PCT No.: PCT/SE89/00147
   § 371 Date: Jan. 23, 1990
   § 102(e) Date: Jan. 23, 1990

[87] PCT Pub. No.: WO89/09186
   PCT Pub. Date: Oct. 5, 1989

[30] Foreign Application Priority Data
   Mar. 25, 1988 [SE] Sweden ............. 88001108-5

[51] Int. Cl.⁵ ............. B32B 3/00; C25D 5/00; B01D 50/00
[52] U.S. Cl. ............. 428/156; 205/134; 205/224; 428/167; 428/178; 428/181; 428/182; 428/188; 428/906; 29/110; 29/121.1; 29/890; 264/56; 264/67; 204/129.1; 422/168; 422/180; 502/439; 502/527
[58] Field of Search ............ 29/890, 428, 110, 121.1; 428/182, 184, 174, 116, 156, 178, 167, 188, 181, 906; 55/269; 264/56, 67; 204/14.1, 38.6, 42, 58, 129.1; 422/168, 186; 502/439, 527

[56] References Cited
U.S. PATENT DOCUMENTS
4,719,680 1/1988 Cyron .................. 478/116

Primary Examiner—Ellis P. Robinson
Assistant Examiner—Donald J. Loney
Attorney, Agent, or Firm—Cushman, Darby & Cushman

[57] ABSTRACT

Flow dividers for dividing a hot gas flow into serveral partial flows through parallel internal channels are used in heat exchangers and as catalyst carriers, and can be produced by shaping the flow divider from metallic aluminium through extrusion or winding, then converting it to hydrated aluminium oxide through anodic oxidation while it is slowly moving down into an electrolyte (4), and finally converting it to alpha-alumina through heat treatment.

13 Claims, 1 Drawing Sheet

FLOW DIVIDER

BACKGROUND OF THE INVENTION

In power engineering it is a common goal to achieve within a limited volume a transfer of energy between a gas flow and a solid body or a chemical reaction in a gas aided by a catalyst fixed to the surface of a solid body. The solid body must then be shaped with a maximum contact surface with the gas flow without too high flow resistance. The solid body is then often shaped with a large number of parallel channels, separated by thin walls, thereby dividing the gas flow into a large number of partial flows with turbulent flow pattern.

Examples of use of such flow dividers are found among heat exchangers, mufflers, catalyst carriers for chemical industry and for emission control in vehicles. Other examples are for gas flow direction in furnaces, burners and wind tunnels.

For use at high temperatures above 700 degrees C. two types of material are mainly used, none fully satisfactory.

Ceramic materials, such as aluminium oxide, can be extruded as a slurry to form bodies with parallel channels as disclosed in patents EP 294.106 and EP 275.162, and thereafter be converted by heat treatment to water-free alumina, but have disadvantages due to built-in stresses, fragility, difficulty in handling prior to the heat treatment and difficulty to shape the channel entries for low flow resistance. They may need complex mounting devices for enclosure in metal, as shown in U.S. Pat. No. 3,966,419.

Metals are easy to shape, both by extrusion and by winding together grooved, corrugated or pleated strips as shown in U.S. Pat. No. 4,719,680, but at elevated temperatures they are mechanically unstable by creep deformation, and chemically unstable by reaction with the gases.

SUMMARY OF THE INVENTION

The present invention concerns a method of making flow dividers, where the shaping is done in a metallic state, and a conversion to ceramic material is carried out after the shaping. This results in greater liberty in choice of shape, and lower cost.

It is well known that anodic oxidation in an electrolyte containing oxalic acid permits conversion of the whole thickness of a thin-walled aluminium object to hydrated aluminium oxide. It is also known that heat treatment of hydrated aluminium oxide can convert it to non-hydrated aluminium oxide in the alpha-alumina modification, which is tough and wear resistent. It is also known to combine these known steps to fabricate simply shaped items such as loudspeaker membranes from alpha-alumina, according to the patent applications DE 35 42 202 and DE 35 46 548.

The shapes of metallic flow dividers, extruded as well as wound, comprise portions with larger thickness than average, such as where two walls meet, and narrow passages where the current density and the oxidation rate are less than average, such as where two layers touch when wound together, or far into the central channels. If such bodies are anodized with the known methods, it would be impossible to avoid metallic remnants where the thickness is large or the oxidation rate low, because these portions lose contact with the current source when the thinner easily oxidated portions have been converted. During a subsequent heat treatment, the metal would melt and damage the shape of the body.

According to the invention, the flow divider with parallel channels is shaped in a first step by extrusion or by winding together corrugated, pleated or grooved strips. If desired, the mechanical stability of a wound divider can be improved by thermal bonding in heated inert gas.

In a second step, the channel exits or entrances are chemically deburred to lower the flow resistance.

In a third step, the aluminium metal is converted to hydrated aluminium oxide through anodic oxidation in an electrolyte containing oxalic acid, with a current source connected to the upper end of the flow divider and the flow divider is slowly lowered into the electrolyte, with the channels vertically oriented while the current flows. All parts of the flow divider are then successively converted to hydrated aluminium oxide, with the not yet converted metal below the surface of the electrolyte occurring as a middle layer with downwards taperingly decreasing thickness as shown in FIG. 1. At thicker or slowly oxidized portions, the taper will reach farther down below the surface of the electrolyte, at easily oxidized portions not so far. There is no risk of formation of non-converted metallic remnants. When the desired length for the divider has been converted, the current source is disconnected.

In a fourth step, the flow divider is converted from hydrated aluminium oxide to water-free alpha-alumina through heat treatment at a high temperture exceeding 700 degrees C. If the flow divider is to be used as a catalyst carrier, the catalyst is thereafter applied in one or more steps.

DETAILED DESCRIPTION

Figure 1:
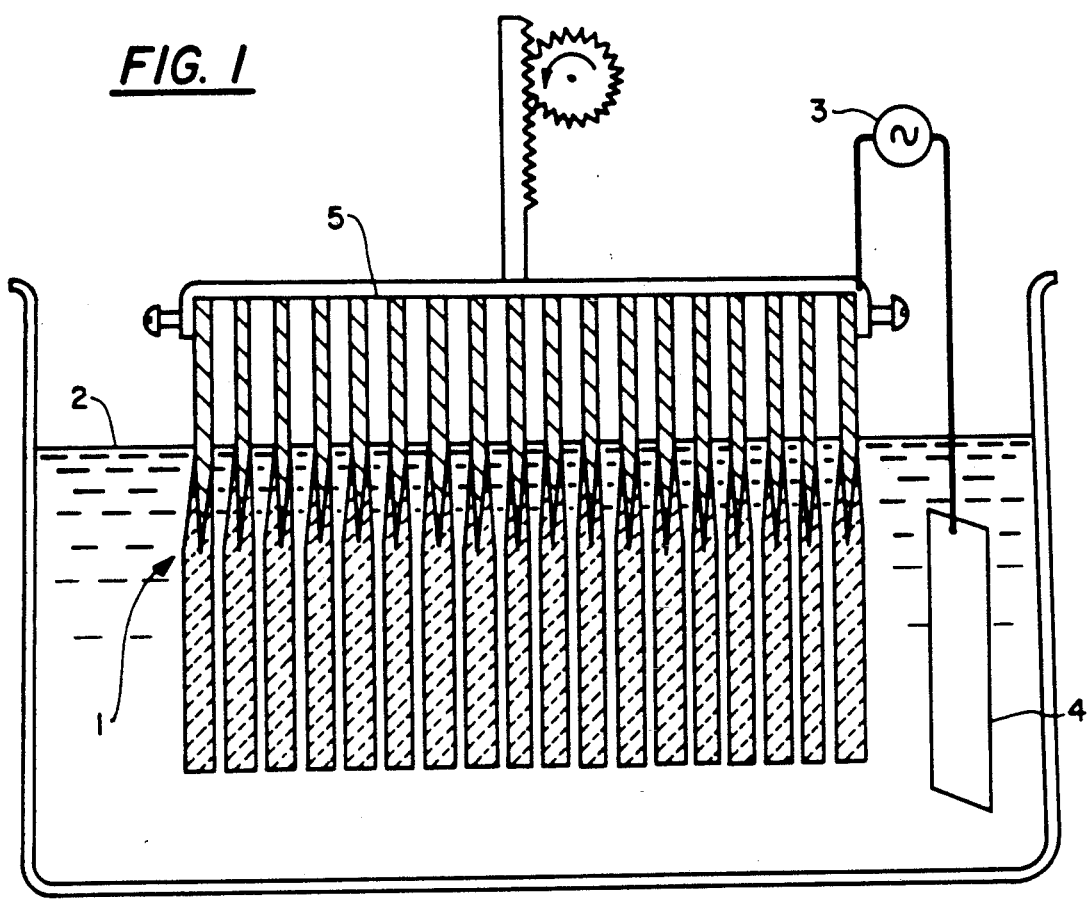
FIG. 1 is a diagrammatic vertical cross-sectional view of apparatus for carrying out the anodic oxidation of a metallic aluminium extruded part to hydrated aluminum oxide in accordance with the method of the present invention.

FIG. 1 shows in vertical cross-section how the slow immersion during a third step of the method that is disclosed in more detail below ensures that lower parts are first converted from metallic aluminum to hydrated aluminum oxide and no metallic remnants are left, even at thicker or slowly oxidized portions. The current source 3 has one of its terminals connected to the electrolyte 4 and its other terminal to the upper end of the metallic preformed aluminium flow divider 5 which is shown in cross section in FIG. 1. Below the surface 2 of the electrolyte, the thickness of the not yet converted aluminium layer in the middle of the walls is taperingly decreasing, such that it has its original thickness at the surface 2 of the electrolyte and below this decreases to vanishingly thin at that level 1 where it has been subject to oxidation long enough for the whole thickness to be converted.

Figure 2:
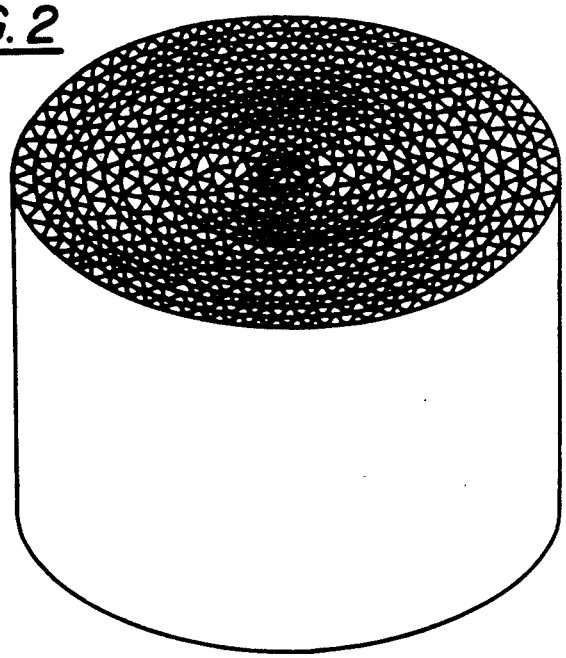
FIG. 2 is a simplified perspective view of a preferred product produced by the method of the present invention.

FIG. 2 shows a flow divider which can be manufactured through extrusion. The invention is not limited to this shape of the channels, and also includes flow dividers shaped by winding. The invention is not limited to items with cylindrical outer surfaces.

In practicing a preferred embodiment of the method of the present invention, an elongated body of aluminium metal is formed through extrusion, with a large number of parallel internal channels, separated by thin walls. Suitable dimensions are for the wall thickness 0.1 to 0.5 mm, and for the channel width 1 to 4 mm, where the smaller dimensions in both instances refer to catalyst carriers, and the larger dimensions in both instances refer to heat exchangers. As an alternative, the body can be formed by winding together one or more aluminium strips, at least one of them with a corrugated, pleated or grooved surface.

This body is cut to a length somewhat exceeding the desired length of the flow divider, is then thoroughly cleaned, whereafter one end is dipped in an alkaline etching solution to deburr and round the channel entrances. Special shaping to facilitate later enclosure or attachment of the flow divider can be made at this stage.

The other end of the body is connected to a current source, the other terminal of which is connected to an electrolytic bath, containing oxalic acid, and the body is then slowly lowered into the electrolyte while the current flows. The aluminium metal is then, through anodic oxidation, converted to hydrated aluminium oxide, starting at the lower end, the wall thickness becoming larger than before the conversion, and wound layers in contact becoming permanently joined.

When a long-enough piece of the body has been converted, it is removed from the electrolyte. Remaining metallic portions at the upper end are cut away. The body is then heated in an oven (not shown) to a temperature above 700 degrees C. The choice of temperature and heating time depends on the shape of the body and the type of oven. Ovens with microwave heating will require temperatures up to 1100 degrees and times up to 30 minutes; convection ovens or radiation ovens will need higher temperatures or longer time. This heating stop converts the hydrated aluminium oxide to water-free alpha-alumina.

If the body is to be used as a catalyst carrier, the channels are coated with catalyst material after it has cooled.

Flow dividers according to the invention can be used as catalyst carriers in exhaust systems or chemical industry, as heat exchangers and as flow equalizers in convection ovens. The invention is not restricted to cylindrical shape or to the use within certain temperature ranges. By performing the shaping on a metallic body, it can be fitted to different shape requirements. The good chemical resistance of alpha-alumina makes the invention useful also in applications where an aggressive chemical environment is encountered.

We claim:

1. A method for producing a multi-channel gas flow divider made of alpha-alumina, comprising:
    (a) forming out of metallic aluminum a body of generally constant transverse cross-sectional shape throughout the longitudinal extent thereof between two opposite ends thereof, so that the body has a plurality of internal channels extending longitudinally thereof between said ends and has, within said transverse cross-sectional shape, some regions which have a greater effective wall thickness than others;
    (b) while supporting said body in an upright position so that one said end is lowermost, progressively lowering said body into a bath of electrolyte while applying opposite electrical charges to:
        (i) said body from above said bath, and
        (ii) said electrolyte in said bath in such a sense as to thereby cause longitudinally and thicknesswise progressive anodization of said metallic aluminum to hydrated aluminum oxide from externally of said lowermost end, upwards and inwards to such an extent that said metallic aluminum is substantially fully converted to hydrated aluminum oxide throughout a portion of the longitudinal extent thereof extending upwards from said lowermost end; and
    (c) thereafter converting said hydrated aluminum oxide in said portion to alpha-alumina by heating said portion to a temperature exceeding 700° C.

2. The method of claim 1, wherein:
said step of forming comprises extruding a shape from metallic aluminum, cutting said shape to a desired length to provide said body, and deburring said channels at said one end of said body prior to conducting step (b).

3. The method of claim 1, wherein:
said step of forming comprises winding into a multiple-layer coil a corrugated strip of metallic aluminum and thereby creating said channels.

4. The method of claim 3, wherein:
said step of forming further comprises thermally bonding said layers together.

5. The method of claim 4, wherein:
said step of forming further comprises deburring said channels at said one end of said body prior to conducting step (b).

6. The method of claim 1, wherein:
said step of forming comprises winding into a multiple-layer coil a pleated strip of metallic aluminum and thereby creating said channels.

7. The method of claim 6, wherein:
said step of forming further comprises thermally bonding said layers together.

8. The method of claim 7, wherein:
said step of forming further comprises deburring said channels at said one end of said body prior to conducting step (b).

9. The method of claim 7, wherein:
said step of forming comprises winding into a multiple-layer coil a grooved strip of metallic aluminum and thereby creating said channels.

10. The method of claim 9, wherein:
said step of forming further comprises thermally bonding said layers together.

11. The method of claim 10, wherein:
said step of forming further comprises deburring said channels at said one end of said body prior to conducting step (b).

12. The method of claim 1, further comprising:
between steps (b) and (c), severing said portion from said body.

13. A multi-channel gas flow divider produced by the process of claim 12.

* * * * *